United States Patent
Hanafee et al.

(10) Patent No.: US 11,151,253 B1
(45) Date of Patent: Oct. 19, 2021

(54) CREDENTIALING CLOUD-BASED APPLICATIONS

(71) Applicant: Wells Fargo Bank, N.A., San Francisco, CA (US)

(72) Inventors: Brian J. Hanafee, Pleasanton, CA (US); Phillip John Crump, Roseville, MN (US)

(73) Assignee: WELLS FARGO BANK, N.A., San Fransisco, CA (US)

( * ) Notice: Subject to any disclaimer, the term of this patent is extended or adjusted under 35 U.S.C. 154(b) by 211 days.

(21) Appl. No.: 15/982,501

(22) Filed: May 17, 2018

Related U.S. Application Data

(60) Provisional application No. 62/508,033, filed on May 18, 2017.

(51) Int. Cl.
| | |
|---|---|
| *G06F 21/44* | (2013.01) |
| *H04L 29/06* | (2006.01) |
| *H04L 9/08* | (2006.01) |
| *G06F 9/455* | (2018.01) |
| *G06F 21/57* | (2013.01) |

(52) U.S. Cl.
CPC .......... *G06F 21/57* (2013.01); *G06F 9/45558* (2013.01); *G06F 21/44* (2013.01); *H04L 9/0825* (2013.01); *H04L 9/0894* (2013.01); *H04L 63/0823* (2013.01); *H04L 63/12* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,838,961 | B2 | 9/2014 | Zarfoss, III et al. |
| 9,021,009 | B2 | 4/2015 | Van Biljon et al. |
| 9,081,940 | B2 | 7/2015 | Trevor et al. |
| 9,083,531 | B2 | 7/2015 | Chenna |
| 9,147,086 | B1 * | 9/2015 | Potlapally ............... G06F 21/64 |
| 9,209,979 | B2 | 12/2015 | Spiers et al. |
| 9,319,269 | B2 | 4/2016 | Arun et al. |
| 9,473,482 | B2 | 10/2016 | Koivuniemi et al. |
| 9,479,503 | B2 | 10/2016 | Griffin et al. |
| 2009/0228967 | A1 | 9/2009 | Gbadegesin et al. |

(Continued)

OTHER PUBLICATIONS

M. Lucyantie, et al. "Attestation with Trusted Configuration Machine," 2011 International Conference on Computer Applications and Industrial Electronics, 4 pages.

*Primary Examiner* — Kambiz Zand
*Assistant Examiner* — Arezoo Sherkat
(74) *Attorney, Agent, or Firm* — Kilpatrick Townsend & Stockton LLP

(57) ABSTRACT

The innovation disclosed and claimed herein, in one aspect thereof, comprises systems and methods of credentialing an application in a cloud environment. The application is determined to be a trusted application type. The application is provided with a certificate service process dedicated to request and receive a certificate from a source outside the cloud environment. An integration component retrieves the secret and provides it to the application that is inside the cloud environment. The secret is verified within the cloud environment and the application is deployed as a trusted application instance inside the cloud environment.

12 Claims, 5 Drawing Sheets

(56) References Cited

U.S. PATENT DOCUMENTS

| | | | |
|---|---|---|---|
| 2011/0179477 A1* | 7/2011 | Starnes | H04L 63/12 726/9 |
| 2012/0096271 A1* | 4/2012 | Ramarathinam | H04L 63/0807 713/172 |
| 2012/0110055 A1* | 5/2012 | Van Biljon | G06Q 30/04 709/201 |
| 2012/0167162 A1* | 6/2012 | Raleigh | H04L 41/082 726/1 |
| 2012/0265976 A1* | 10/2012 | Spiers | H04L 63/0218 713/2 |
| 2013/0061281 A1 | 3/2013 | Pao et al. | |
| 2013/0074179 A1* | 3/2013 | Das | G06F 9/452 726/18 |
| 2014/0082059 A1* | 3/2014 | Das | G06F 15/16 709/203 |
| 2014/0082350 A1* | 3/2014 | Zarfoss, III | H04L 63/083 713/155 |
| 2014/0282889 A1* | 9/2014 | Ishaya | H04L 63/08 726/4 |
| 2014/0373126 A1* | 12/2014 | Hussain | G06F 21/335 726/9 |
| 2015/0012977 A1* | 1/2015 | Huh | G06F 9/468 726/4 |
| 2015/0026772 A1 | 1/2015 | Verma | |
| 2015/0156194 A1 | 6/2015 | Modi et al. | |
| 2015/0178495 A1* | 6/2015 | Sheehan | G06F 9/468 726/16 |
| 2015/0180848 A1* | 6/2015 | Koivuniemi | H04L 63/0823 726/4 |
| 2015/0229629 A1* | 8/2015 | Ishaya | H04L 63/08 726/4 |
| 2015/0244711 A1 | 8/2015 | Venkataraman et al. | |
| 2015/0350188 A1* | 12/2015 | Gilpin | G06F 21/33 726/9 |
| 2016/0028551 A1 | 1/2016 | Hussain et al. | |
| 2016/0142408 A1* | 5/2016 | Raepple | H04L 63/0884 726/9 |
| 2016/0156700 A1 | 6/2016 | Chen et al. | |
| 2016/0182473 A1* | 6/2016 | Cignetti | H04L 63/0823 713/171 |
| 2016/0330177 A1* | 11/2016 | Singleton, IV | H04L 9/0827 |
| 2016/0381023 A1* | 12/2016 | Dulce | H04L 63/10 726/9 |
| 2017/0118249 A1* | 4/2017 | Motukuru | H04L 12/4641 |
| 2017/0230374 A1* | 8/2017 | Pawl | G06F 21/44 |
| 2017/0257361 A1* | 9/2017 | Niemela | G06F 21/6218 |
| 2018/0159845 A1* | 6/2018 | Aronov | H04L 63/0435 |
| 2018/0176023 A1* | 6/2018 | Prickett | G06F 21/12 |
| 2018/0262485 A1* | 9/2018 | Roth | H04L 63/083 |
| 2019/0123904 A1* | 4/2019 | Ackerman | G06F 21/45 |
| 2019/0334884 A1* | 10/2019 | Ross | H04L 63/0442 |

* cited by examiner

CREDENTIALING CLOUD-BASED APPLICATIONS

CROSS-REFERENCE TO RELATED APPLICATIONS

This application claims the benefit of U.S. Provisional Application Ser. No. 62/508,033, filed May 18, 2017, and entitled "CREDENTIALING CLOUD-BASED APPLICATIONS," the entirety of which is expressly incorporated herein by reference.

BACKGROUND

Cloud solutions (or applications) are useful for centralized access to software and/or hardware. However, authenticating an application in a cloud environment can become difficult as a virtual environment is created for each application instance. It is difficult to keep machine variables such as passwords or authentication certificates in the cloud as the instances change frequently. Password and database solutions have been implemented in the past. However, passwords are too reliant on user memory can be compromised and database solutions have been shown to be unsecure from outside threats.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in aspects, comprises systems and methods of credentialing cloud applications. A system includes a cloud controller that receives a request to open an application instance in a cloud environment. The cloud controller determines the application instance is a trusted type of application that employs a secret to authenticate the application instance as a trusted type of application. A certificate service master provides the application instance with a certificate service component within the cloud environment. An integration component provides a secret from a secrets store outside the cloud environment to the certificate service component. The integration component integrates the secret into the certificate service component.

In aspects, the subject innovation provides substantial benefits in terms of credentialing application instances. One advantage resides in a certificate provided from an external entity such that the certificate is unaffected by cloud environment variables. Another advantage resides in certificates provided from a single external location.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
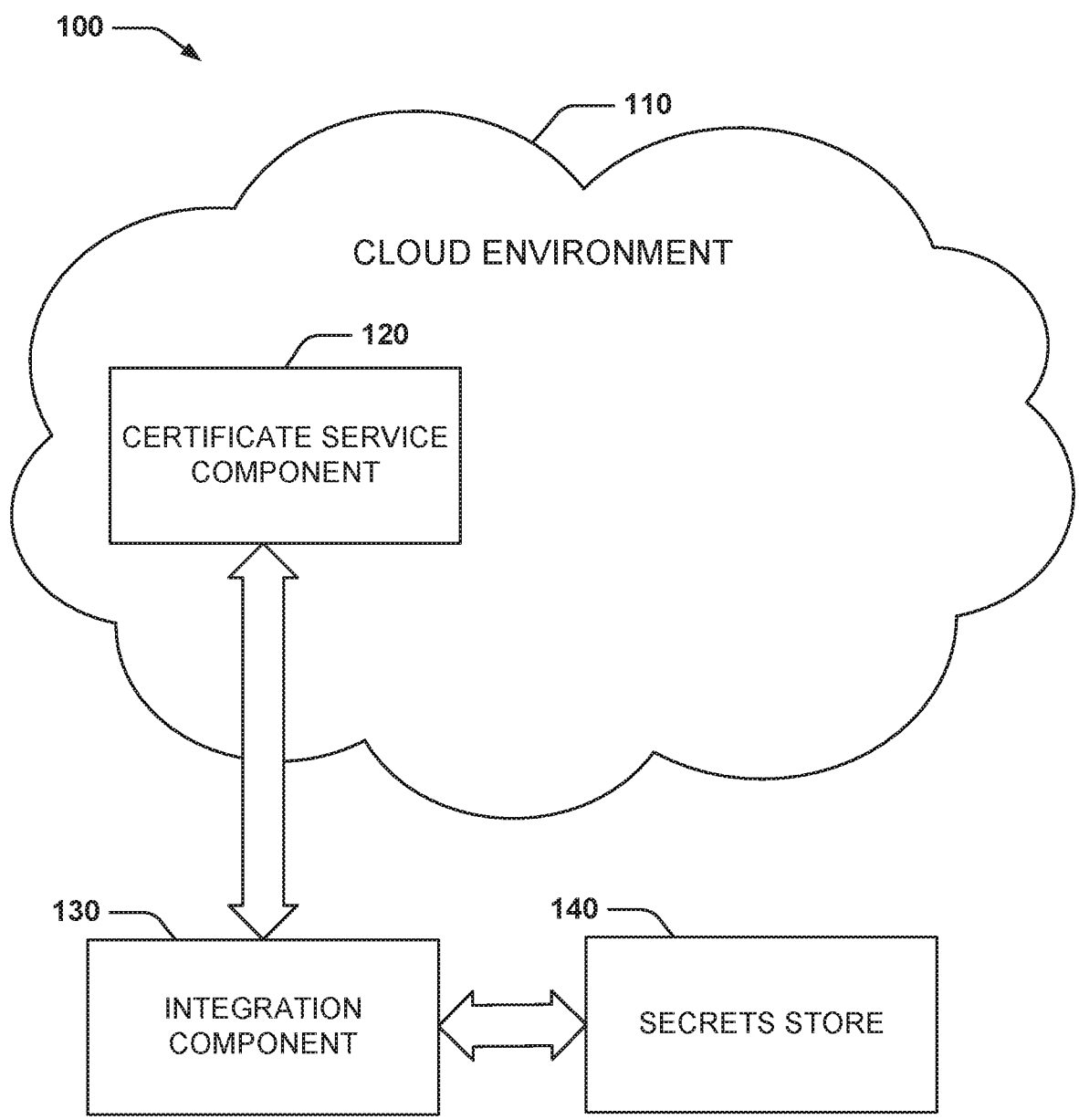
FIG. 1 illustrates a component diagram of a system for credentialing cloud based applications.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 1 illustrates a system 100 for credentialing or authenticating a cloud application instance. For example, an application is opened in a cloud environment system that is remotely accesses by a user. The system 100 includes a cloud environment 110. The cloud environment 110 can employ one or more processors to provide a cloud solution to a remote user. The user can manipulate the cloud environment 110 remotely. For example, the user may run an application instance in a virtual environment or virtual machine created by the cloud environment 110. The cloud environment 110 provides the application instance to the user.

The application instance can be determined to be a trusted application instance. If the application instance is a trusted application instance, the application instance may be authenticated in the cloud environment 110. The application instance is provided with a certificate service component 120. In some embodiments, the certificate service component 120 is a process or processor dedicated to seek and receive a secret from a source outside the cloud environment 110. In some embodiments the secret is a digital certificate that credentials the application instance as a trusted application instance. The digital certificate can employ a public-key infrastructure. In other embodiments, the secret is a token, passcode, password, and/or the like that credentials or authenticates the application instance as a trusted application instance.

The certificate service component 120 continuously or periodically requests the secret from an integration component 130. The integration component 130 resides outside the cloud environment 110. The integration component 130 receives a heartbeat function from the certificate service component 120. The heartbeat function notifies the integration component 130 that the application instance the trusted application is active and therefore requests the secret from the integration component 130. In some embodiments, the heartbeat function is employed by a different process in the cloud environment 110.

The integration component 130 can access a secrets store 140 to retrieve the secret. The secrets store 140 can be a storage solution. For example, the secrets store 140 can be a database, hard drive, cloud storage, and/or the like. The secrets store 140 stores secrets for each trusted application. The integration component 140 can receive trusted application information from the heartbeat function. The integration component 130 queries the secrets store 140 to retrieve the secret associated with the trusted application. The integration component 130 provides the secret to the certificate service component 120. The cloud environment 110 verifies the certificate service component 120 has the correct secret associated with the trusted application for the application instance. The application instance is authenticated and can be deployed via the cloud environment 110 by the user.

Figure 2:
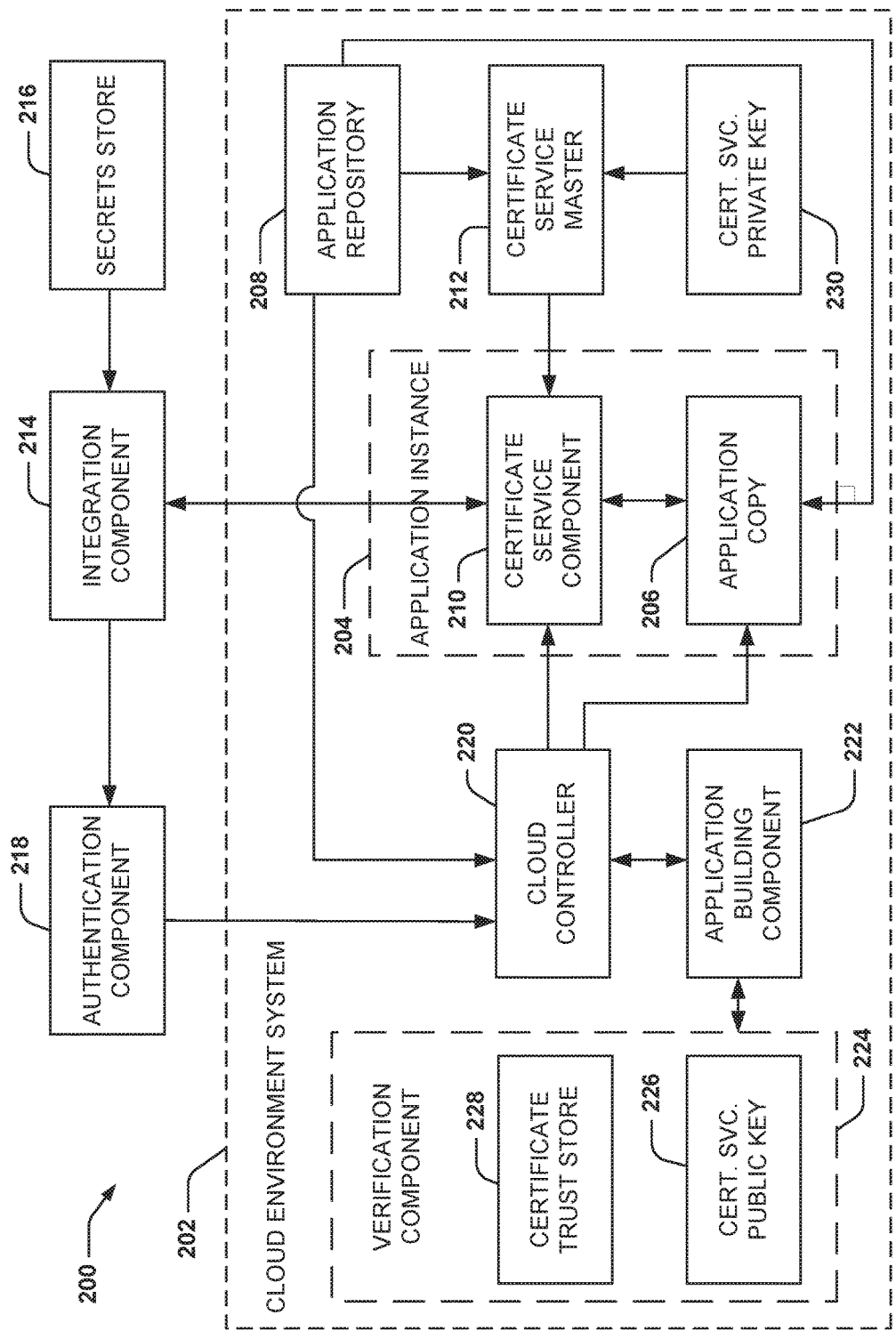
FIG. 2 illustrates a detailed component diagram for credentialing cloud based applications.

FIG. 2 illustrates a detailed component diagram of a system 200. The system 200 includes a cloud environment 202. The cloud environment 202 can employ one or more processors to provide a cloud solution to a remote user. The user can manipulate the cloud environment 202 remotely. For example, the user may run an application instance 204 in a virtual environment or virtual machine created by the cloud environment 202. The cloud environment 202 provides access to the application instance 204 to the user.

The application instance 204 includes a copy of the application 206. The application copy 206 is a copy of the application code that is used to open and/or run the application instance 204 in the cloud environment 202. The application copy 206 is provided by the application repository 208. The application repository 208 is a storage solution that can store copies of applications that can be opened in the cloud environment 202.

The application instance 204 can be determined to be a trusted application instance. For example, a virtual environment or virtual machine of an operating system may be considered a trusted application; the user may open an instance of operating system in the cloud environment 202. If the application instance 204 is a trusted application, the application instance 204 may be authenticated in the cloud environment 202. The application instance 204 is provided with a certificate service component 210. In some embodiments, the certificate service component 120 is a process or processor dedicated to receive a secret from a source outside the cloud environment 110. In some embodiments, the secret is a digital certificate. The digital certificate verifies the application instance as a trusted application instance. In some embodiments, the secret is protected and transferred using authentication keys generated and associated with the secret and/or the trusted application. In other embodiments, the secret is protected and transferred using secure shell (SSH) authentication keys generated and associated with the secret and/or the trusted application.

In some embodiments, the certificate service component 210 is provided by a certificate service master 212. The certificate service master 212 is a permanent entity in the cloud that keeps a copy of the certificate service component 210. The certificate service master 212 provides the copy of the certificate service component 210 to the application instance 204 when the application instance 204 is initialized or opened in the cloud environment 202. The application instance employs the copy as the certificate service component 210.

The certificate service component 120 can continuously or periodically request the secret from an integration component 214. The integration component 214 resides outside the cloud environment 202. The integration component 214 receives a heartbeat function from the certificate service component 210. The heartbeat function notifies the integration component 214 that the application instance 204 of the trusted application is active and therefore requests the secret from the integration component 214.

The integration component 214 can access a secrets store 216 to retrieve the secret. The secrets store 216 can be a storage solution. For example, the secrets store 216 can be a database, hard drive, cloud storage, and/or the like. The secrets store 216 stores secrets for each trusted application. The integration component 214 can receive trusted application information from the heartbeat function. The integration component 214 queries the secrets store 216 to retrieve the secret associated with the trusted application.

The integration component 214 provides the secret to the certificate service component 210. In some embodiments, the integration component 214 provides the secret directly to the certificate service component 210. In other embodiments, the integration component 214 passes the secret to an authentication component 218. The authentication component 218 can reside outside (e.g. remotely) the cloud environment 202. The authentication component 218 can verify a username, password, or other authentication data from the user to verify the user's identity and credentials to access the cloud environment 202 and/or open the application instance 204.

In some embodiments, the secret can be authenticated by the authentication component 218 using pre-shared key. In this embodiment, the authentication component 218 can receive and authenticate a first key provided outside of the cloud environment 202 with a second key provided inside the cloud environment 202. In some embodiments, after authenticating, the authentication component 218 can provide the secret to the cloud environment 202 using an encrypted file transfer protocol or other transfer protocols. In a specific embodiment, the secret is authenticated using an SSH public/private key infrastructure and a SSH file transfer protocol or other file transfer protocols.

The authentication component 218 can provide the secret and/or the verification to a cloud controller 220. The cloud controller 220 can be a processor that operates the cloud environment 202. The cloud controller 220 creates the application instance 204 and/or other applications for one or more users. The cloud controller 220 receives the authenticated secret from the authentication component 218. The secret is deposited into the certificate service component 210 by the cloud controller 210 at runtime such that the application instance 204 can be verified as a trusted application. In some embodiments, the cloud controller 220 can retrieve the application copy 206 from the application repository 208 and run it in the application instance 204 at runtime.

The cloud controller can build the application instance 204 using an application building component 222. In some embodiments, the application building component is a JavaScript implementation that detects, compiles, and releases new requests for application instances 204 within the cloud environment 202. In some embodiments, before the application instance 204 is built, the application building component 222 validates a connection between the application instance 204 and the certificate service component 210 using a certificate service public key. The application building component 222 provides a verification component 224 to authenticate the certificate service public key. The verification component 224 receives a certificate service public key 226 from the application building component 222. The verification component 224 checks the certificate service public key 226 against a certificate trust store 228. The certificate trust store 228 can be a database, storage, hard drive, and/or the like. The certificate trust store 228 includes a listing of public keys for trusted applications. The verification component 226 verifies a match for the certificate service public key 226 exists in the certificate trust store 228 for the trusted application. After verification, the application building component 222 compiles and releases the application instance 204 to be opened and used in the cloud environment 202. The application building component 222 can construct a keystore to store keys for the specific application instance 204. In some embodiments, the application building component 222 is a buildpack.

When the application instance is released by the application building component 222, the cloud controller 220 deploys and starts the application copy 206 along with the certificate service component 204. The application copy 206 binds to the certificate service component 204. The application copy 206 connects to the certificate service component 204 to use and/or receive the secret from the certificate service component 204. The application instance 204 is credentialed and can be used in the cloud environment 202 by the user.

In some embodiments, the certificate service master 212 includes a private certificate service key 230. The private certificate service key 230 verifies that the certificate service master 212 as a verified master to be copied into the application instance 204 as the certificate service component 210.

Figure 3:
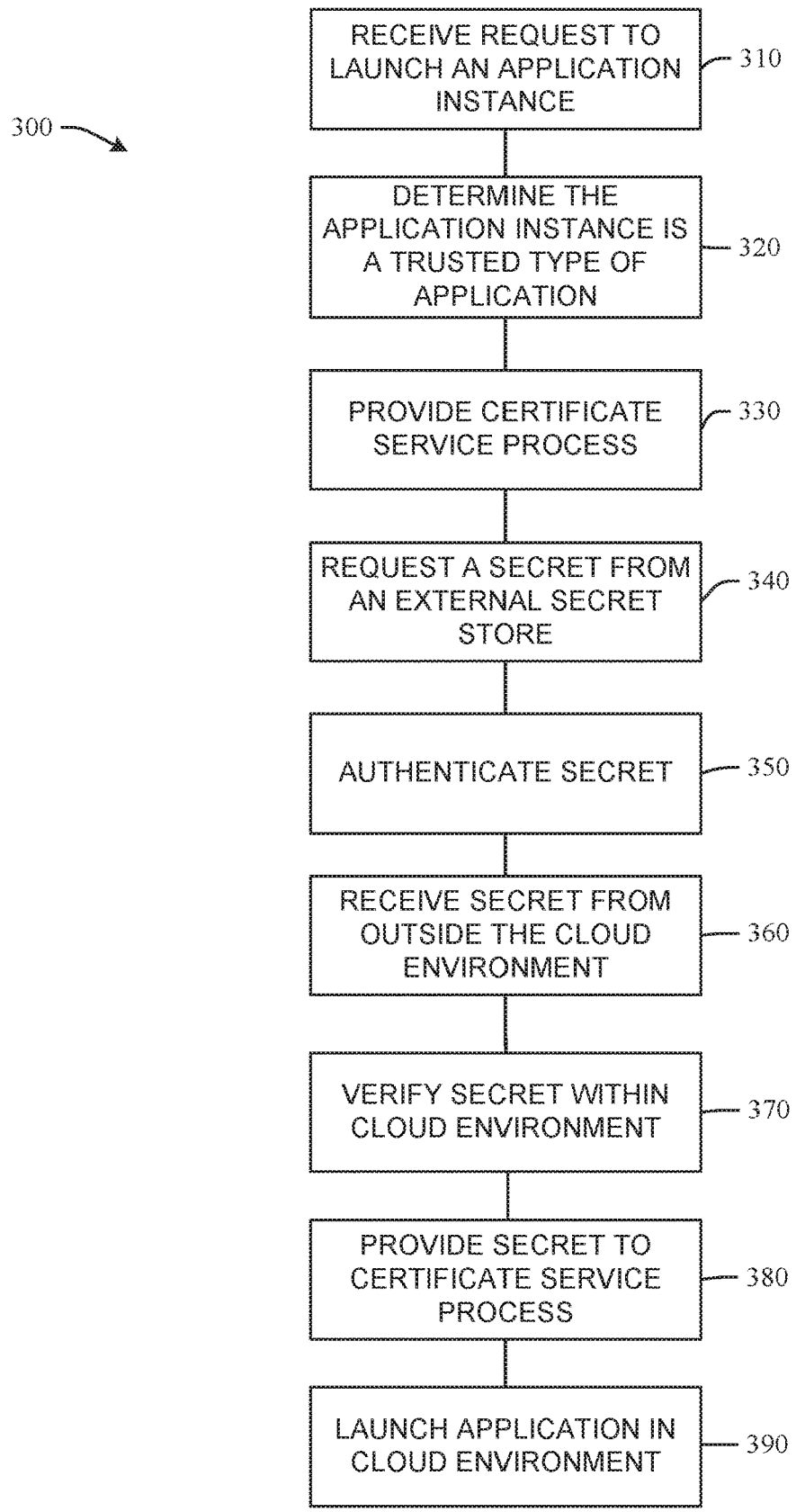
FIG. 3 illustrates a method for credentialing cloud based applications.

With reference to FIG. 3, example method 300 is depicted for credentialing cloud-based applications. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 300 is described in conjunction with a specific example is for explanation purposes.

FIG. 3 illustrates a method 300 for credentialing a cloud application. At 310, a request to launch an application instance in a cloud environment is received. For example, a user authenticates to a cloud environment and requests to start an application instance within the cloud environment. At 320, the application instance is determined to be a trusted type of application that requires a secret to authenticate the application instance as a trusted type of application. In the example, in order for a specific application to be run in the cloud environment, the application calls for authentication as a trusted application.

At 330, the application instance is provided with a certificate service process within the cloud environment. At 340, a secret is requested by the certificate service process from an external integration component. Continuing the example, the certificate service process is run with an exclusive function of requesting the secret. The secret is a digital certificate that credentials the application instance as a trusted application. The digital certificate is a digital file stored externally from the cloud environment. In some embodiments, the certificate can be transferred using SSH file transfer protocols.

At 350, the secret is authenticated outside the cloud environment. In the example, the secret can be authenticated using an SSH public-private key pair. Where the SSH private key outside the cloud environment and the SSH public key within the cloud environment are authenticated. At 360, the secret is received from the integration component to the cloud environment. In the example, the secret is passed from the integration component to the certificate service process using SSH file transfer protocols. At 370, the secret is verified within the cloud environment. In the example, the secret can be verified using the SSH public-private keys. At 380, the application instance is provided with the secret. For example, a cloud controller can receive the secret (digital certificate) using SSH protocols and provide the secret to the certificate service process and/or the application instance. At 390, the application instance is launched inside the cloud environment as a trusted application instance for the user. The application instance can be run properly as a trusted application once it receives a valid secret (digital certificate).

Figure 4:
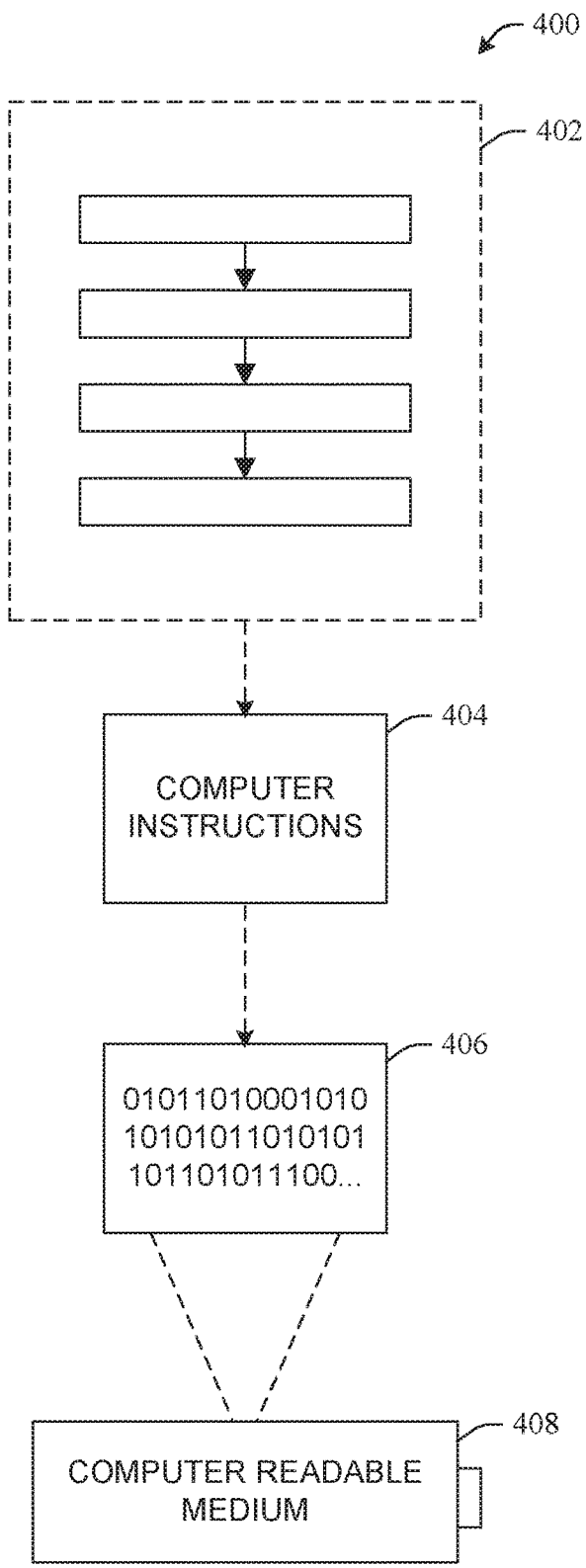
FIG. 4 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 4, wherein an implementation 400 comprises a computer-readable medium 408, such as a CD-R, DVD-R, flash drive, a platter of a hard disk drive, etc., on which is encoded computer-readable data 406. This computer-readable data 406, such as binary data comprising a plurality of zero's and one's as shown in 406, in turn comprises a set of computer instructions 404 configured to operate according to one or more of the principles set forth herein. In one such embodiment 400, the processor-executable computer instructions 404 is configured to perform a method 402, such as at least a portion of one or more of the methods described in connection with embodiments disclosed herein. In another embodiment, the processor-executable instructions 404 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 5:
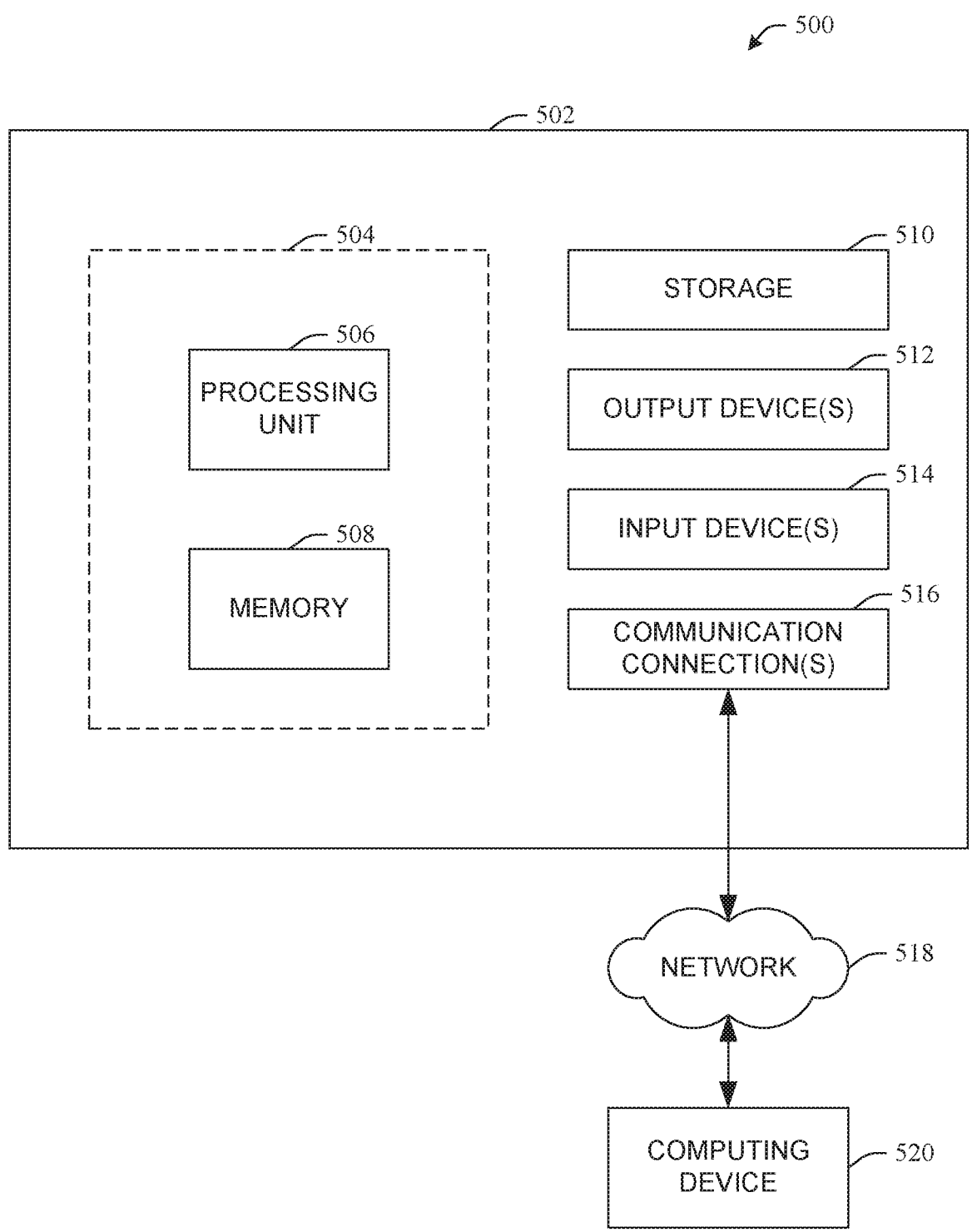
FIG. 5 illustrates a computing environment where one or more of the provisions set forth herein can be implemented, according to some embodiments.

With reference to FIG. 5 and the following discussion provide a description of a suitable computing environment in which embodiments of one or more of the provisions set forth herein can be implemented. The operating environment of FIG. 5 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 5 illustrates a system 500 comprising a computing device 502 configured to implement one or more embodiments provided herein. In one configuration, computing device 502 can include at least one processing unit 506 and memory 508. Depending on the exact configuration and type of computing device, memory 508 may be volatile, such as RAM, non-volatile, such as ROM, flash memory, etc., or some combination of the two. This configuration is illustrated in FIG. 5 by dashed line 504.

In these or other embodiments, device 502 can include additional features or functionality. For example, device 502 can also include additional storage such as removable storage or non-removable storage, including, but not limited to, magnetic storage, optical storage, and the like. Such additional storage is illustrated in FIG. 5 by storage 510. In some embodiments, computer readable instructions to implement one or more embodiments provided herein are in storage 510. Storage 510 can also store other computer readable instructions to implement an operating system, an application program, and the like. Computer readable instructions can be accessed in memory 508 for execution by processing unit 506, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 508 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 502. Any such computer storage media can be part of device 502.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 502 can include one or more input devices 514 such as keyboard, mouse, pen, voice input device, touch input device, infrared cameras, video input devices, or any other input device. One or more output devices 512 such as one or more displays, speakers, printers, or any other output device can also be included in device 502. The one or more input devices 514 and/or one or more output devices 512 can be connected to device 502 via a wired connection, wireless connection, or any combination thereof. In some embodiments, one or more input devices or output devices from another computing device can be used as input device(s) 514 or output device(s) 512 for computing device 502. Device 502 can also include one or more communication connections 516 that can facilitate communications with one or more other devices 520 by means of a communications network 518, which can be wired, wireless, or any combination thereof, and can include ad hoc networks, intranets, the Internet, or substantially any other communications network that can allow device 502 to communicate with at least one other computing device 520.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    receiving a request to launch an application instance in a cloud environment;
    determining the application instance is a trusted type of application that employs a secret to authenticate the application instance as a trusted type of application, wherein the secret is a digital certificate, a password, or a code;
    copying a certificate service master stored in the cloud environment to the application instance as a certificate service process, wherein the certificate service master is permanent entity stored in the cloud that keeps a copy of the certificate service process;
    providing the application instance with the certificate service process within the cloud environment;
    receiving the secret from an external secrets store outside the cloud environment; and
    providing a continuous heartbeat function from the certificate service process to continuously request the secret, wherein the heartbeat function is an exclusive function of requesting the secret.

2. The method of claim 1, comprising:
    integrating the secret into the certificate service process.
3. The method of claim 2, comprising:
    verifying the application instance as a trusted application instance using the secret integrated into the certificate service process.
4. The method of claim 1, wherein the secret is a digital certificate that credentials the application instance as a trusted application.
5. The method of claim 1, comprising:
    verifying the certificate service process by confirming a public key in a certificate trust store.
6. A system, comprising:
    one or more hardware processors having instructions to control:
    a cloud controller that receives a request to open an application instance in a cloud environment, wherein the cloud controller determines the application instance is a trusted type of application that employs a secret to authenticate the application instance as a trusted type of application;
    a certificate service master that provides the application instance with a certificate service component within the cloud environment, wherein the certificate service component copies the certificate service master stored in the cloud environment to the application instance, wherein the certificate service master is permanent entity stored in the cloud that keeps a copy of the certificate service component; and
    an integration component that provides a secret from a secrets store outside the cloud environment, wherein the certificate service component provides a continuous heartbeat function to the integration component to continuously request the secret, wherein the heartbeat function is an exclusive function of requesting the secret.
7. The system of claim 6, wherein the integration component integrates the secret into the certificate service component.
8. The system of claim 7, comprising:
    a verification component that verifies the application instance as a trusted application instance using the secret integrated into the certificate service component.
9. The system of claim 8, wherein the verification component verifies the secret by confirming a public key in a certificate trust store.
10. The system of claim 6, wherein the secret is a digital certificate that credentials the application instance as a trusted application.
11. A non-transitory computer readable medium having instructions to control one or more processors configured to:
    receive a request to launch an application instance in a cloud environment wherein, the cloud controller determines the application instance is a trusted type of application that requires a secret to authenticate the application instance as a trusted type of application;
    copy a certificate service master stored in the cloud environment to the application instance, wherein the certificate service master is permanent entity stored in the cloud that keeps a copy of a certificate service process;
    provide the application instance with a certificate service component within the cloud environment;
    provide a secret from a secrets store that is outside the cloud environment;
    integrate the secret into the certificate service component;
    authenticate the application instance as a trusted application instance using the secret integrated into the certificate service component; and
    provide a continuous heartbeat function to an integration component to continuously request the secret, wherein the heartbeat function is an exclusive function of requesting the secret.
12. The non-transitory computer readable medium of claim 11, wherein the processors are configured to: verify the secret by confirming a public key in a certificate trust store.

* * * * *

UNITED STATES PATENT AND TRADEMARK OFFICE
CERTIFICATE OF CORRECTION

| | | |
|---|---|---|
| PATENT NO. | : 11,151,253 B1 | Page 1 of 1 |
| APPLICATION NO. | : 15/982501 | |
| DATED | : October 19, 2021 | |
| INVENTOR(S) | : Brian J. Hanafee and Phillip John Crump | |

It is certified that error appears in the above-identified patent and that said Letters Patent is hereby corrected as shown below:

On the Title Page

Item (73), Delete:
"Assignee: WELLS FARGO BANK, N.A., San Fransisco, CA (US)"

And Insert:
-- Assignee: WELLS FARGO BANK, N.A., San Francisco, CA (US) --

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*